United States Patent [19]

McCullough et al.

[11] 4,236,911
[45] Dec. 2, 1980

[54] PURIFICATION AND CONVERSION OF PHOSPHORIC ACID TO AMMONIUM PHOSPHATES

[75] Inventor: John F. McCullough; Leslie R. Tate; John F. Phillips Jr., all of Florence, Ala.

[73] Assignee: Tennessee Valley Authority, Muscle Shoals, Ala.

[21] Appl. No.: 92,771

[22] Filed: Nov. 8, 1979

[51] Int. Cl.$^3$ .................................. C01B 15/16
[52] U.S. Cl. ................................ 71/34; 71/43; 423/310; 423/321 S
[58] Field of Search .............. 71/34, 43; 423/310, 423/313, 321 S

[56] References Cited

U.S. PATENT DOCUMENTS

| 3,894,143 | 7/1975 | Von Semel et al. ........... 423/321 S |
| 4,152,402 | 5/1979 | Wacters, Jr. et al. ............. 423/310 |

OTHER PUBLICATIONS

Kim et al., "Conditions Affecting the Purification of Simulated Wet-Process Phosphoric Acids by Solvent Extraction," Journal of Agricultural and Food Chemistry, (Apr. 30, 1974).

Primary Examiner—Wayne A. Langel
Attorney, Agent, or Firm—Robert A. Petrusek

[57] ABSTRACT

A method of purifying filter-grade wet-process phosphoric acid, then converting the purified phosphoric acid directly to ammonium phosphate without first concentrating the phosphoric acid. The wet-process phosphoric acid is treated with a mixture of ammonia or an ammonium salt and acetone near or at the boiling point of the mixture. Solids are separated from the phosphoric acid liquid phase. The solids are a mixture of metal phosphates, gypsum, and fluosilicates. Adhering phosphoric acid is washed free of the solids with fresh acetone. Wash liquor is combined with purified phosphoric acid. Gaseous ammonia is added to the phosphoric acid-acetone extract in the ratio necessary to produce either monoammonium phosphate (MAP) or diammonium phosphate (DAP). Ammonium phosphate is filtered from the acetone-water mother liquor, then, depending on the level of ammonium phosphate left in the mother liquor and the type of ammonium phosphate produced (MAP or DAP), the mother liquor is treated in one of several ways. If DAP is produced and the amount of DAP left dissolved in the mother liquor is sufficiently low, the acetone is distilled from the mother liquor and recycled and the aqueous waste either discarded or used for filter cake wash water in the phosphoric acid plant. If necessary, the amount of ammonium phosphate left with the aqueous waste can be reduced to nil by adding lime to the mother liquor. This converts ammonium phosphate to dicalcium phosphate and ammonia. The precipitated calcium phosphate is separated and returned to the phosphoric acid plant. Ammonia and acetone are co-distilled and return to the process.

10 Claims, 13 Drawing Figures

THE PHASE SYSTEM MONOAMMONIUM PHOSPHATE-WATER-ACETONE AT 25°C

THE PHASE SYSTEM MONOAMMONIUM PHOSPHATE-WATER-ACETONE AT 25°C

THE PHASE SYSTEM MONOAMMONIUM PHOSPHATE-DIAMMONIUM PHOSPHATE - WATER-ACETONE FOR RATIO N:P=1.50 AT 25°C (EQUIMOLAR MAP AND DAP CONSIDERED AS $NH_4H_2PO_4 \cdot (NH_4)_2HPO_4$)

P₂O₅ SOLUBILITY FOR AMMONIUM PHOSPHATES IN LIGHT PHASE ACETONE-WATER SOLUTIONS AT 25°C $P_2O_5$ LOSSES TO MOTHER LIQUID (OR LIGHT PHASE FOR MAP-DAP MIX) FOR AMMONIUM PHOSPHATE PRODUCTION
(CALCULATED FOR 28% $P_2O_5$ ACID, 25°C)

AMMONIUM PHOSPHATE RECOVERY FROM MONOAMMONIUM PHOSPHATE MOTHER LIQUID FILTRATE

EFFECT OF ACETONE AND AMMONIA ON $P_2O_5$ IN THE SOLID PHASE

EFFECT OF ACETONE AND AMMONIA ON ALUMINUM REMOVAL

EFFECT OF ACETONE AND AMMONIA ON IRON REMOVAL

EFFECT OF ACETONE ON MAGNESIUM REMOVAL

EFFECT OF ACETONE AND AMMONIA ON FLUORINE REMOVAL

EFFECT OF ACETONE AND AMMONIA ON SULFATE REMOVAL

PURIFICATION AND CONVERSION OF PHOSPHORIC ACID TO AMMONIUM PHOSPHATES

The invention herein described may be manufactured and used by or for the Government for governmental purposes without the payment to us of any royalty therefor.

FIELD OF INVENTION

The present invention relates to a method of purifying phosphoric acid and converting said acid to ammonium phosphate. More particularly, the invention relates to the process whereby phosphoric acid is treated with acetone and ammonia causing impurities to precipitate from the acid in an easily filterable form and the resulting purified acid extract is treated with sufficient gaseous ammonia to convert the phosphoric acid to either monoammonium phosphate or diammonium phosphate in solid form which may be easily separated from the acetone-water mother liquor.

BACKGROUND OF THE INVENTION

Three general types of phosphate deposits exist—igneous, sedimentary, and metamorphic. All three types supply significant quantities of phosphate to world markets, but sedimentary deposits are by far the most important. Most of the world's phosphate production is used for fertilizer products.

The predominant phosphate mineral in phosphate ore is apatite. The chemical formula of apatite is often written as $Ca_5(PO_4)_3F$, but considerable departure from this formula is possible. Substitution of chloride and hydroxide ions for fluoride ion, carbonate substitution for phosphate and magnesium or sodium substitution for calcium are but a few of the many possible ion substitutions (Lehr, J. R., Proceedings, Fertilizer Industry Roundtable, 61, 1967).

The gangue constituents most commonly associated with unaltered sedimentary phosphate rock deposits are quartz, clay minerals, feldspar, metal sulfides, organic matter, calcite and dolomite. Reworking the deposit by stream activity, ground water leaching and weathering enriches the deposit by removing clays and carbonates. The accessory minerals in these weathered and reworked deposits are usually feldspar, quartz, some clay, metal oxides, and gypsum.

Phosphate rock producers most actively seek the reworked and weathered deposits because these ore bodies contain less clay, and magnesium and calcium carbonates. Producers remove accessory minerals from apatite by a combination of desliming and sizing followed, in some cases, by fatty acid and amine flotation. Phosphate ores containing silica-based accessory minerals are particularly amenable to this type of beneficiation [Beall, J. V., Min. Eng. 80–114 (1966); Smani, et al, Trans. Soc. Min. Eng. AIME, 258 168–182 (1975)] because there is sufficient difference in surface properties between silicate and phosphate minerals to allow easy separation by flotation. But in the United States, particularly Florida, these high grade weathered deposits are becoming depleted and processors must turn to the more abundant but lower quality deposits.

The lower quality deposits contain higher amounts of iron, aluminum and magnesium impurities. Because separation of these impurities from apatite is never complete, the use of lower quality phosphate deposits will result in lower quality phosphate rock.

In the United States, most phosphate rock is converted to fertilizer products by first dissolving the rock in sulfuric acid. Major products of this reaction are gypsum and phosphoric acid, the latter containing about 28 to 30 percent $P_2O_5$. Any iron, aluminum and magnesium in the phosphate rock also dissolves in the acid. Gypsum is discarded and the dilute phosphoric acid is further concentrated to 40 to 54 percent $P_2O_5$. The concentrated acid is either ammoniated to ammonium phosphate or converted to triple superphosphate by reacting the concentrated acid with more phosphate rock or converted to solutions of ammonium polyphosphate. Concentrating phosphoric acid is the most energy intensive and hence one of the most expensive steps in the conversion of phosphate rock to fertilizer.

Because iron, aluminum and magnesium in the rock report to the phosphoric acid, the consequences of declining rock quality to the fertilizer industry are important. Although these impurities are initially soluble in phosphoric acid, they subsequently precipitate and thereby cause serious problems to fertilizer producers. For example, an excessive amount of sludge, principally complex iron and aluminum phosphates, may form in phosphoric acid made from low-quality phosphate rock. The sludge may form when it is first concentrated or it may later form when the acid is stored before use. When formed during concentration, the sludge fouls the heat exchangers of the acid concentrator causing excessive downtime and cleaning expense. When formed in the concentrated acid, it fills the acid storage tank and stops up pipes and valves.

All of the iron, aluminum, and magnesium in the acid does not precipitate in the sludge. If an excessive amount of these impurities in the acid reach the finished fertilizer products, further problems arise. For example, it may not be possible to reach industry accepted nitrogen grades in diammonium phosphate because cationic impurities—iron, aluminum and magnesium—displace ammonia in the diammonium phosphate product. If triple superphosphate (TSP) is made from acid containing excessive magnesium, the TSP may be hygroscopic.

Thus, there is a need to purify phosphoric acid before concentration and conversion to finished fertilizers. Since concentrating phosphoric acid is energy intensive, and hence costly, it would also be desirable to convert the purified dilute phosphoric acid directly to finished fertilizer, thereby eliminating this costly concentration step.

PRIOR ART

Fertilizer producers have long since recognized the need for acid purification; hence, there is a considerably body of prior art.

The prior art describes the use of both liquid-liquid solvent extraction, hereinafter referred to for the sake of convenience as SX, and solvent precipitation, hereinafter referred to for the sake of convenience as SP, to purify wet-process acid. In both methods, investigators and researchers mixed an organic liquid with impure phosphoric acid, causing the phosphoric acid to partition itself between the liquid organic phase and the impure phase. SX processes produce liquid impure phases, while SP processes yield a solid impure phase.

The prior art teaches the use of various ketones, ethers, or alcohols as organic liquids. The SX processes frequently, but not always, use liquids which are immiscible in water. Liquids used with SP processes are invariably water miscible. In either process, researchers sometimes use ammonia to enhance the separation between phosphoric acid and impurities.

The equipment used in either process, supra, depends on the physical state of the impure phase. The SX processes frequently use mixer-settlers to contact then separate the purified phosphoric acid extract from the liquid phase containing impurities. The SP processes use liquid-solid separation techniques such as filtration or centrifugation to separate the purified extract from solid impurities. The physical properties of the solid phase are very important for making clean liquid-solid separations.

In both processes, the organic liquid must be separated from the purified phosphoric acid. Distillation is frequently used for solvent recovery in both processes.

One must judge the success of any phosphoric acid purification process by three criteria—$P_2O_5$ purity, $P_2O_5$ recovery, and cost.

Fertilizer products do not require excessively pure phosphoric acid. It is only necessary that the fertilizer products meet industry accepted nitrogen and $P_2O_5$ standards and not cause handling problems due to hygroscopicity or dust. All purification processes meet this criteria.

The cost of distilling the organic solvent away from the purified phosphate is one of the larger expenses of any purification process. This cost is minimized by both using as little solvent as possible and using solvents with a low heat of vaporization. The heats of vaporization at their boiling point of commonly used solvents and water are found in Table I, infra.

TABLE I

| Heats of Vaporization | |
|---|---|
| Compound | Heat of Vaporization, cal/gram |
| Methyl alcohol | 263 |
| Ethyl alcohol | 204 |
| Isopropyl alcohol | 159 |
| Acetone | 125 |
| Water | 539 |

Reference to Table I, supra, shows that a process entailing the distilling of acetone is considerably less energy intensive, hence cheaper, than distilling a similar amount of alcohol or water.

The fraction of total $P_2O_5$ recovered in the purified phase is most important since this is the high value product. The $P_2O_5$ left with impurities may not be a total loss because the impure phase can sometimes be blended with other fertilizers or ammoniated and disposed of as low quality fertilizer. But the $P_2O_5$ left with the impurities is definitely low quality and it is obviously desirable to minimize the $P_2O_5$ in this waste.

Solvent extraction processes frequently leave more $P_2O_5$ with the impurities than do solvent precipitation processes.

Numerous investigators have described methods of purifying phosphoric acid by solvent extraction (A. V. Slack, Phosphoric Acid, II, Marcel Dekker, Inc., New York, 1968, pages 709–724). The invention of Walters et al (U.S. Pat. No. 4,152,402) is noteworthy. The investigators discovered that by mixing partially ammoniated phosphoric acid with acetone at 25° C. to 35° C., they partitioned phosphoric acid between an acetone-rich liquid and denser aqueous liquid containing most of the impurities. The upper liquid contained about 75 percent of the total $P_2O_5$, but little of the impurities. The remaining phosphate and most of the impurities settled into the dense liquid raffinate. In some cases, a thick viscous sludge formed rather than two liquids. But, by operating at 25°–35° C. and using proper amounts of ammonia and acetone, they avoided sludge formation. Their invention required between 1.3 and 3.6 Kg acetone per Kg $P_2O_5$ when used with the concentrated merchant grade acid, i.e., (50–54 percent $P_2O_5$). However, when they purified filter grade acid (28–30 percent $P_2O_5$) they required a much larger quantity of acetone—6.3 to 6.8 Kg per Kg $P_2O_5$—for satisfactory operation. These investigators recovered acetone by distillation from the acid extract.

There is also considerable prior art on the use of solvent precipitation acid purification. Frankenfeld et al (U.S. Pat. No. 3,764,657) teach that the addition of isopropyl alcohol to partially ammoniated phosphoric acid causes impurities to precipitate from the acid. McCullough et al, in U.S. Pat. No. 3,975,178, teach the use of methanol and ammonia to precipitate impurities from impure phosphoric acid. Both groups of investigators, supra, used distillation to recover the organic solvent from the purified acid.

The amount of $P_2O_5$ lost to the impure phases with solvent precipitation processes was rather low (~10 percent) compared to the approximately 25 percent reported by Walters et al, supra. However, these solvent precipitation purifications require the use of alcohol and, because of the higher heat of vaporization (see table I, supra), the teachings of both Frankenfeld et al and McCullough et al would incur higher solvent distillation costs than that of Walters et al.

Von Semel et al, in U.S. Pat. No. 3,894,143, substituted acetone for alcohol in their solvent precipitation process, but omitted ammonia. These investigators teach that by adding 13 to 18 Kg acetone per Kg $P_2O_5$ to impure phosphoric acid, they precipitate a sludge containing 37 to 47 percent of the fluorine and 12 to 45 percent of the sulfate in the acid. But the enormous amount of acetone required for operation of their invention compared to that of Frankenfeld et al, or McCullough et al, supra, negates any cost advantage of acetone over alcohol.

After separating the sludge, Von Semel et al ammoniated the acetonephosphoric acid extract causing ammonium phosphate to precipitate. After filtering off the ammonium phosphate product, they distilled acetone away from the mother liquor.

Finally, a Soviet pair [Burova, M. S., and Kochetkov, V. N.; *Zhurnal Prikladnoi Khimii*, 51 (8), page 1688–1692 (1978)] report the use of acetone and ammonia for purifying phosphoric acid by solvent precipitation. These workers used little ammonia—0.03 to 0.06 mole $NH_3$/g atom phosphorus—but much acetone in their process. For purifying merchant grade acid, they recommend using 7 to 8 Kg acetone/Kg $P_2O_5$; but for 30–31 percent $P_2O_5$ acid, 13 Kg acetone/Kg $P_2O_5$ is recommended. They initially state that they precipitate impurities as either amorphous or crystalline solids, but their process describes the precipitate as viscous.

Thus, these previously reported processes suffer from one or more defects. They either leave too much $P_2O_5$ with the impure phase (Walters et al); they use alcohols (McCullough et al and Frankenfeld et al); or they use excessive amounts of acetone (Von Semel et al and Burova et al). It would be very desirable to combine the advantages of Walters' invention, i.e., high purification and low solvent recovery costs due to using moderate amounts of acetone, with the advantages of McCullough et al and Frankenfeld et al, i.e., low $P_2O_5$ losses to the impure phase.

OBJECTS OF THE INVENTION

It is therefore an object of the present invention to purify wet-process phosphoric acid by precipitating objectionable impurities from the acid in an easily filterable form.

Another object of the present invention is to convert the purified phosphoric acid to monoammonium phosphate, diammonium phosphate, or mixtures of mono- and diammonium phosphate without first separating water from the purified acid.

Another object of the present invention is that the energy cost of solvent recovery be low.

A further object of the present invention is that the loss of $P_2O_5$ to the solid phase, which contains impurities, be minimized.

Still another object of the present invention is that the amount of $P_2O_5$ lost during ammonium phosphate preparation be minimized.

Still further and more general objects of the present invention will appear from the more detailed description set forth in the following descriptions and examples.

ADVANTAGES OF THE INVENTION

An advantage of the present invention over the previously described prior art of Walters et al is that $P_2O_5$ losses to the impure phase are much lower. An additional advantage of the present invention over that of Walters et al, as well as that of Burova et al and Von Semel et al, is that our invention requires less acetone. Since acetone must be recovered by distillation for recycle, the energy costs due to distillation are less than in the aforementioned inventions.

Another advantage of the present invention over that of Walters et al, Burova et al, McCullough et al, and Frankenfeld et al is the direct conversion of the purified phosphoric acid to either monoammonium phosphate or diammonium phosphate without first separating water from the purified acid. Because the heat of vaporization of water is very high (see table I supra), separating water from phosphoric acid is very energy intensive and expensive. The present invention eliminates this step.

An additional advantage of the present invention over that of both McCullough et al and Frankenfeld et al is that the present invention uses acetone rather than alcohol to precipitate impurities from the acid. Because the heat of vaporization of acetone (see table I supra) is considerably lower than either methanol or isopropyl alcohol, costs of solvent recovery in the present invention will be lower.

DESCRIPTION OF THE PRESENT INVENTION

The present invention will be better understood from a consideration of the following description taken in connection with the accompanying drawings in which.

Figure 4:
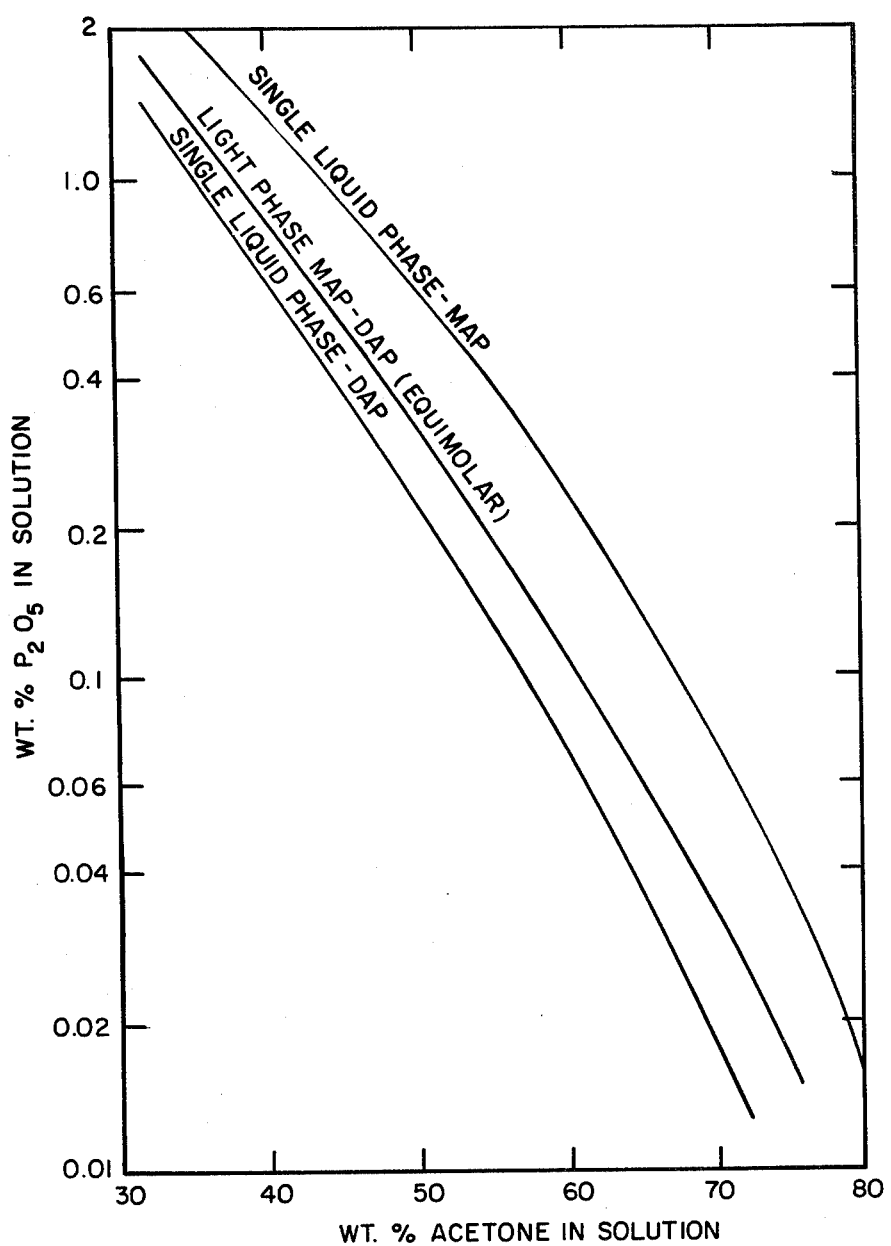

FIG. 4 describes the effect of acetone concentration on the solubility of monoammonium phosphate, diammonium phosphate, or equimolar mixtures of the two.

Figure 5:
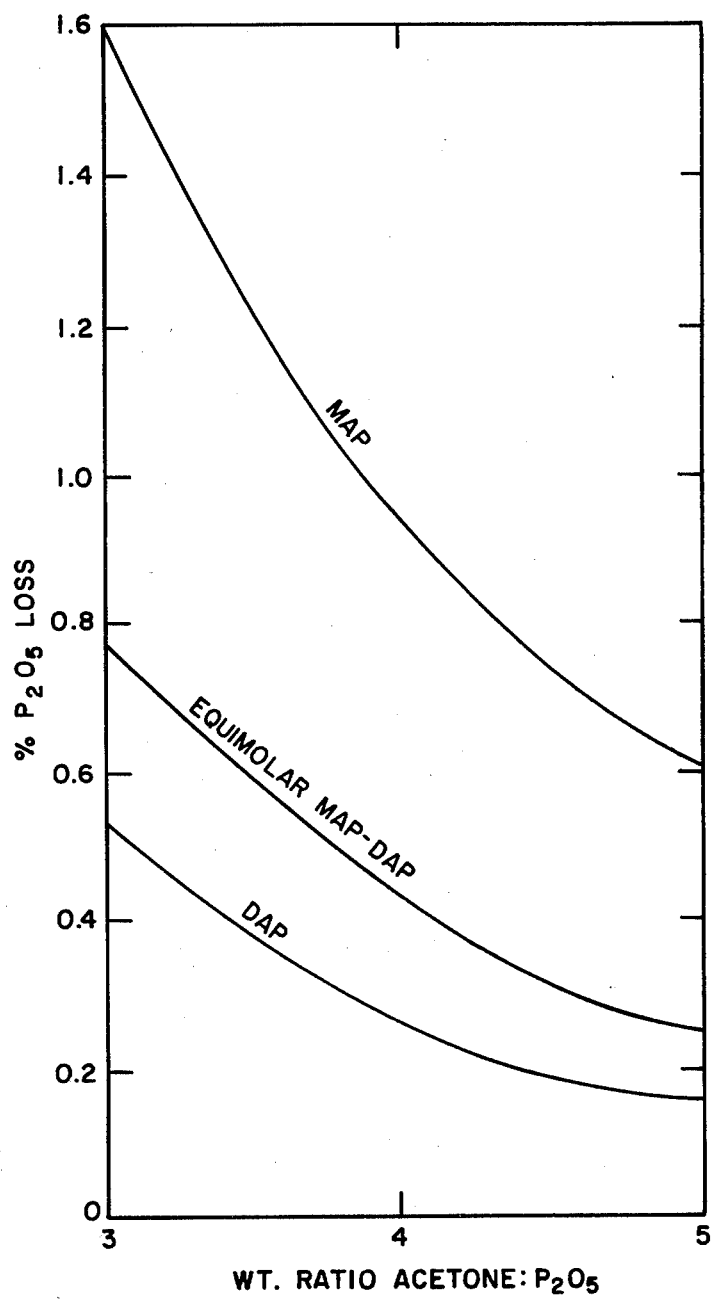

FIG. 5 describes the effect of acetone concentration on the amount of $P_2O_5$ left in solution after either monoammonium phosphate or diammonium phosphate has precipitated.

Figure 6:
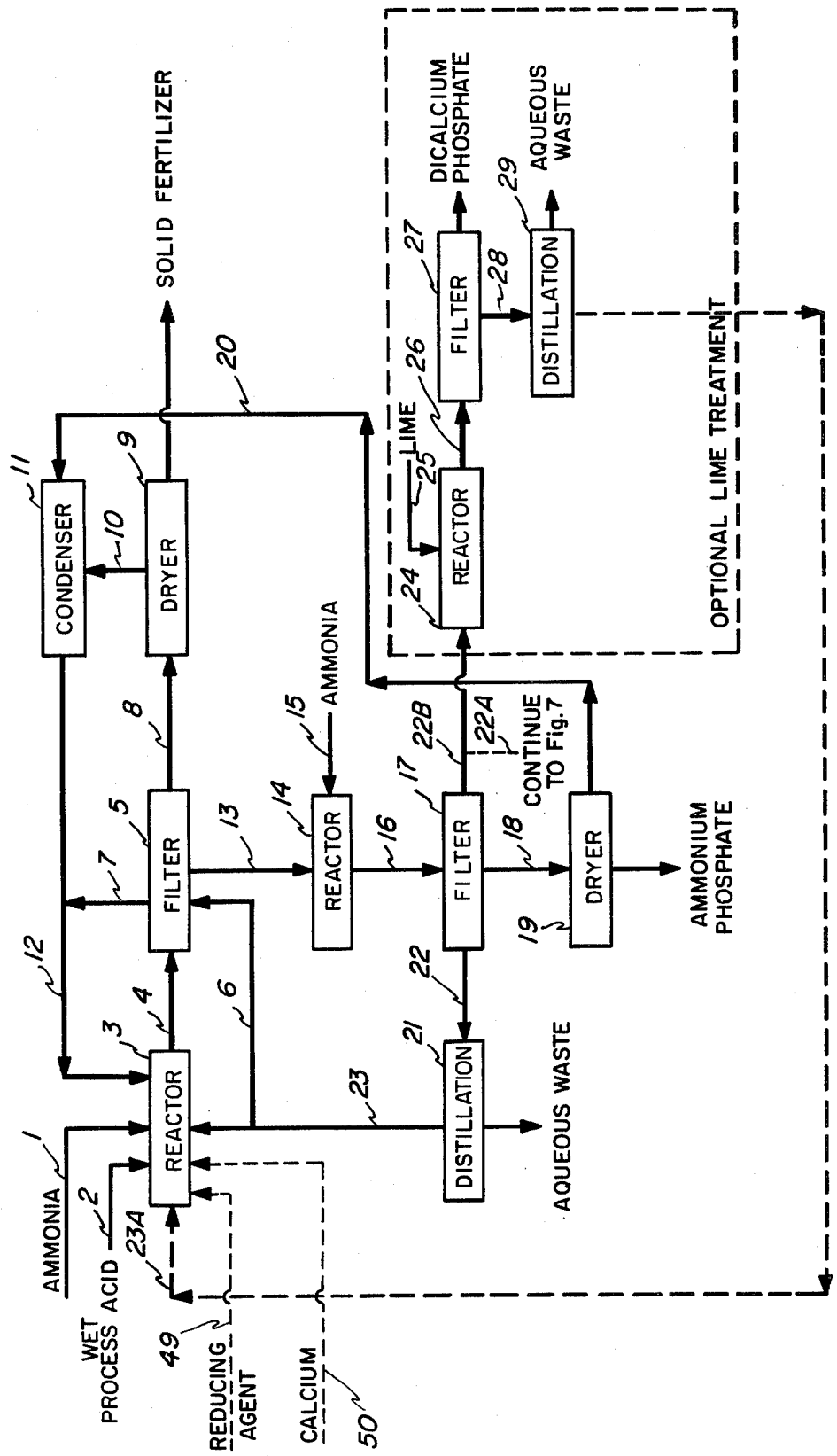
Figure 7:
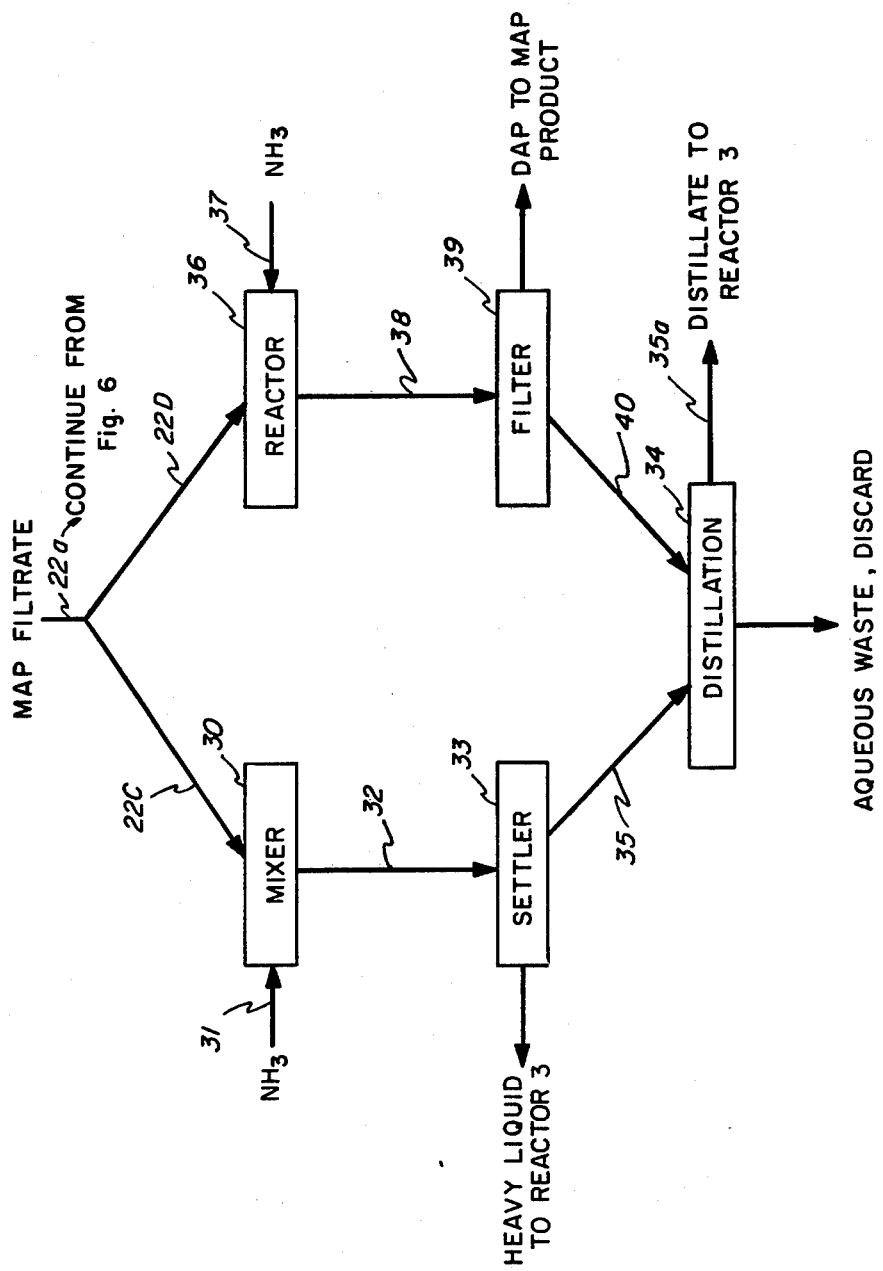
Figure 8:
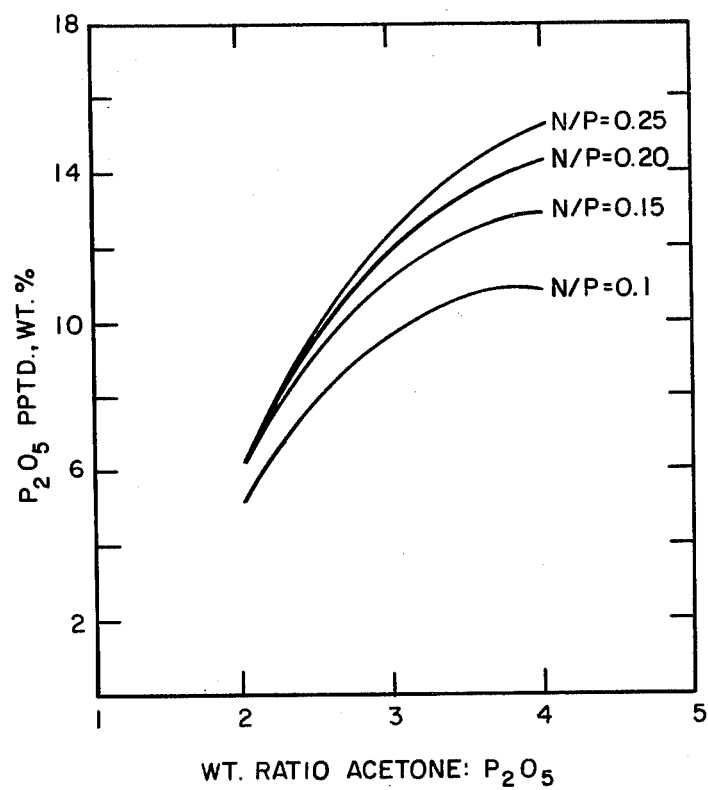
Figure 9:
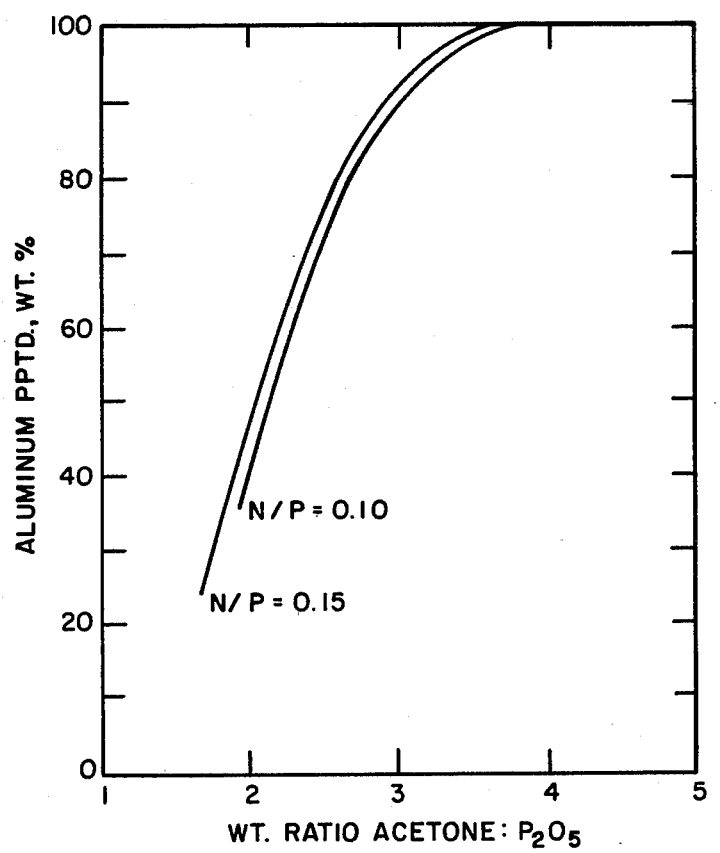
Figure 10:
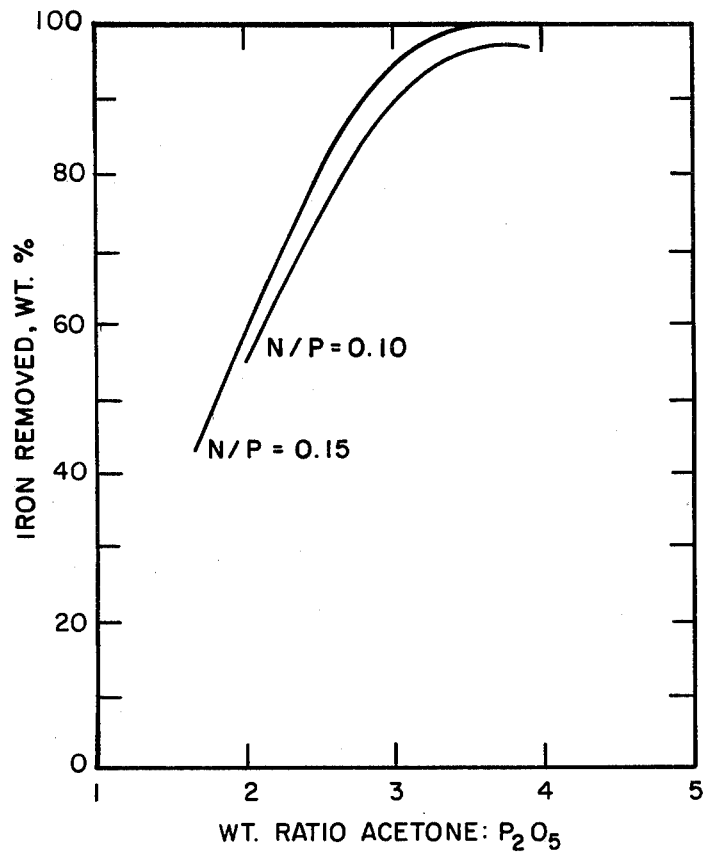
Figure 11:
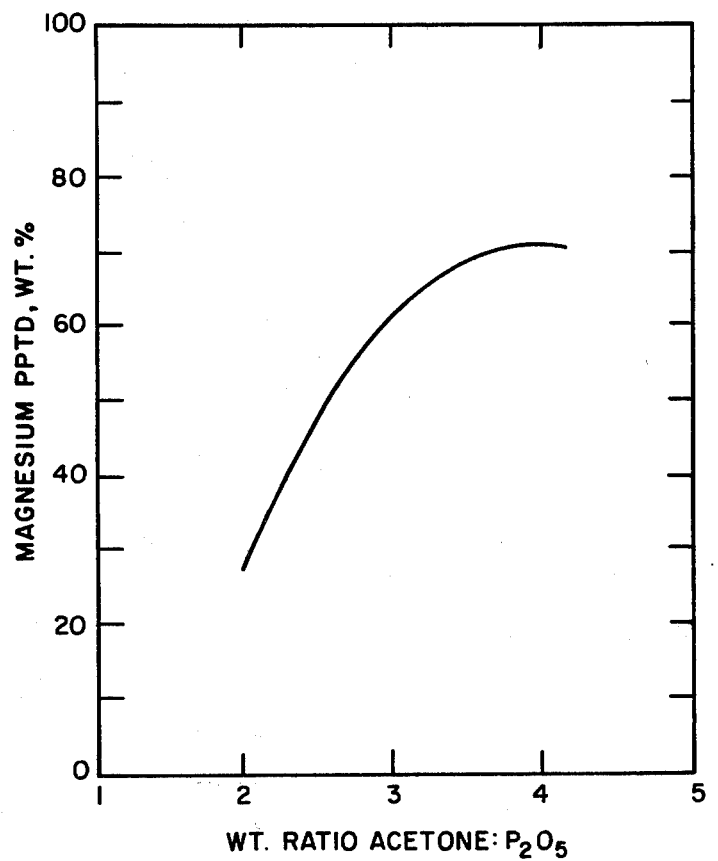
Figure 12:
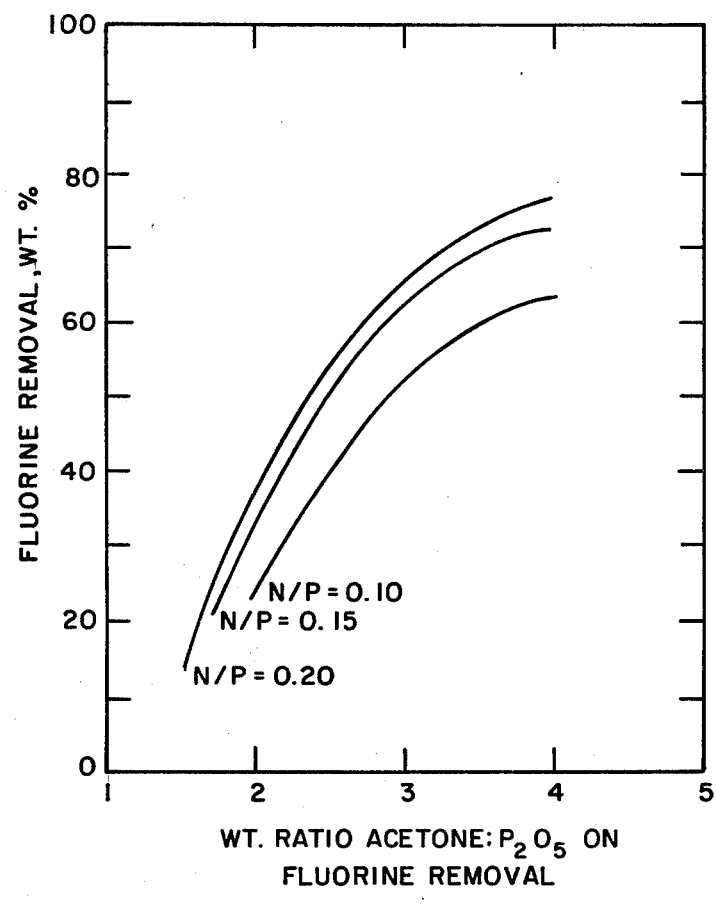
Figure 13:
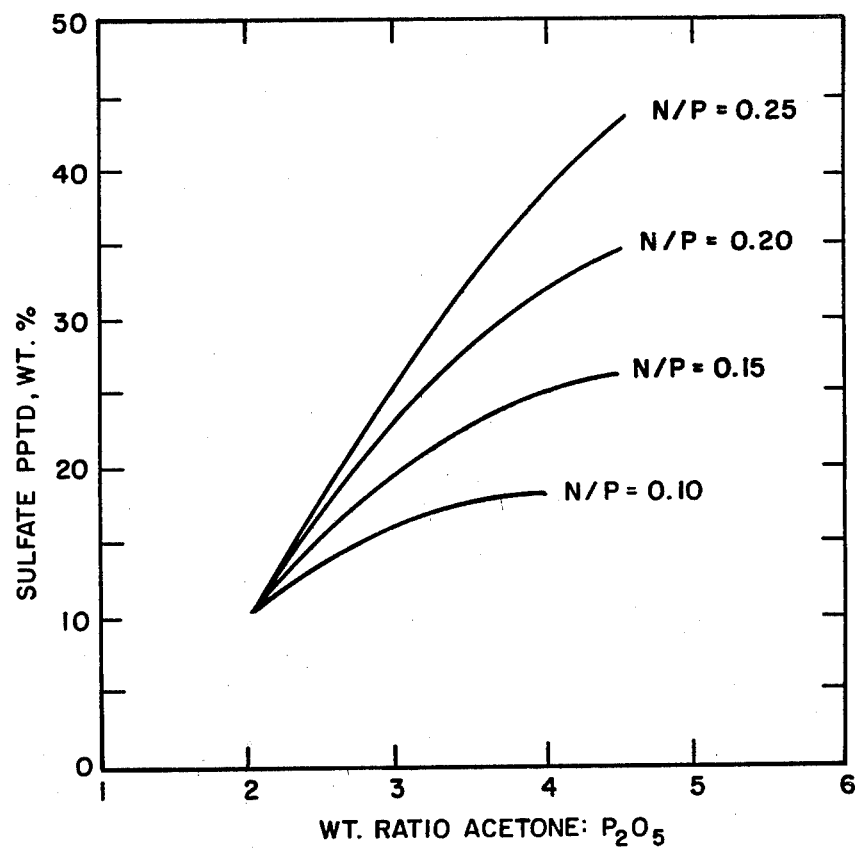

FIGS. 6 and 7 are flowsheets illustrating the principles of the present invention.

FIGS. 8 through 13 illustrate the effects of acetone and ammonia on the removal of $P_2O_5$ and impurities from wet-process acid.

It should be understood that the detailed description of the present invention is not necessarily given by way of limitation, since various changes therein may be made by those skilled in the art without departing from the scope and spirit of the present invention.

In carrying out the objectives of the present invention, we partially ammoniate wet-process phosphoric acid with ammonia, ammonium carbonate, or other ammonium compounds. Gaseous ammonia or ammonium carbonate is preferred because of their ease of use and because they contribute no anions to the acid. The atom ratio nitrogen:phosphorus, hereafter called the N:P ratio, can vary between 0.050 and 0.30. The preferred range would be 0.10 and 0.20.

Additional purification is possible by adding soluble calcium to the acid prior to purification. As much as 0.025 Kg calcium per Kg $P_2O_5$ may be used. A convenient source of calcium is phosphate rock. Uranium may be removed from the acid by reducing the uranium from oxidation state $+6$ to $+4$ with a convenient reducing agent such as metallic iron or zinc dust. If the uranium is already reduced, no reduction is required.

Acetone is added to the stirred ammoniated phosphoric acid mixture. The acetone:$P_2O_5$ weight ratio may vary from 2.0 to 5.0 Kg acetone per Kg $P_2O_5$ but a preferred range would be 3.0 to 4.5.

The mixture is heated at or near reflux temperature (50° to 65° C.) for a time sufficient to allow an easily filterable precipitate to form. Generally 45 minutes is sufficient. Lower reaction temperature could be used if the residence time in the reactor were increased.

The formation of an easily filterable solid is quite unexpected since the work of Walters et al, Von Semel et al, and Burova et al leads one to believe that impurities separate from the extract as a liquid or viscous sludge. Because the impurities separate easily from the extract, both operating costs and $P_2O_5$ losses to the raffinate are low. The $P_2O_5$ in the solids is completely citrate soluble and therefore suitable as a solid fertilizer.

Gaseous ammonia is added to the purified phosphoric acid extract to precipitate ammonium phosphate. If monoammonium phosphate (MAP) is desired, sufficient ammonia is added to the extract to give a mole ratio $NH_3:P_2O_5$ of about two.

If diammonium phosphate (DAP) is desired, the mole ratio $NH_3:P_2O_5$ in the extract is adjusted to about four.

Any temperature up to the boiling point of the mother liquor could be used when precipitating ammonium phosphate, but because ammonium phosphate is more soluble at higher temperatures, a temperature range of 20° to 30° C. is recommended.

Ammonium phosphate rapidly precipitates from the extract leaving a mother liquor consisting largely of acetone and water along with a small amount of dissolved ammonium phosphate. It is not possible to predict how much ammonium phosphate remains in solution without detailed knowledge of the solubility relationships in the system $NH_3$-acetone-$P_2O_5$-$H_2O$, but the enormous amount of acetone used by Von Semel et al and the high water solubility of ammonium phosphate reported by Lenfesty and Brosheer [*J. Chem. Eng. Data* 5 (2), 152 (1960)] strongly suggest that a high acetone concentration is necessary to depress ammonium phosphate solubility to a reasonably low level.

Figure 1:
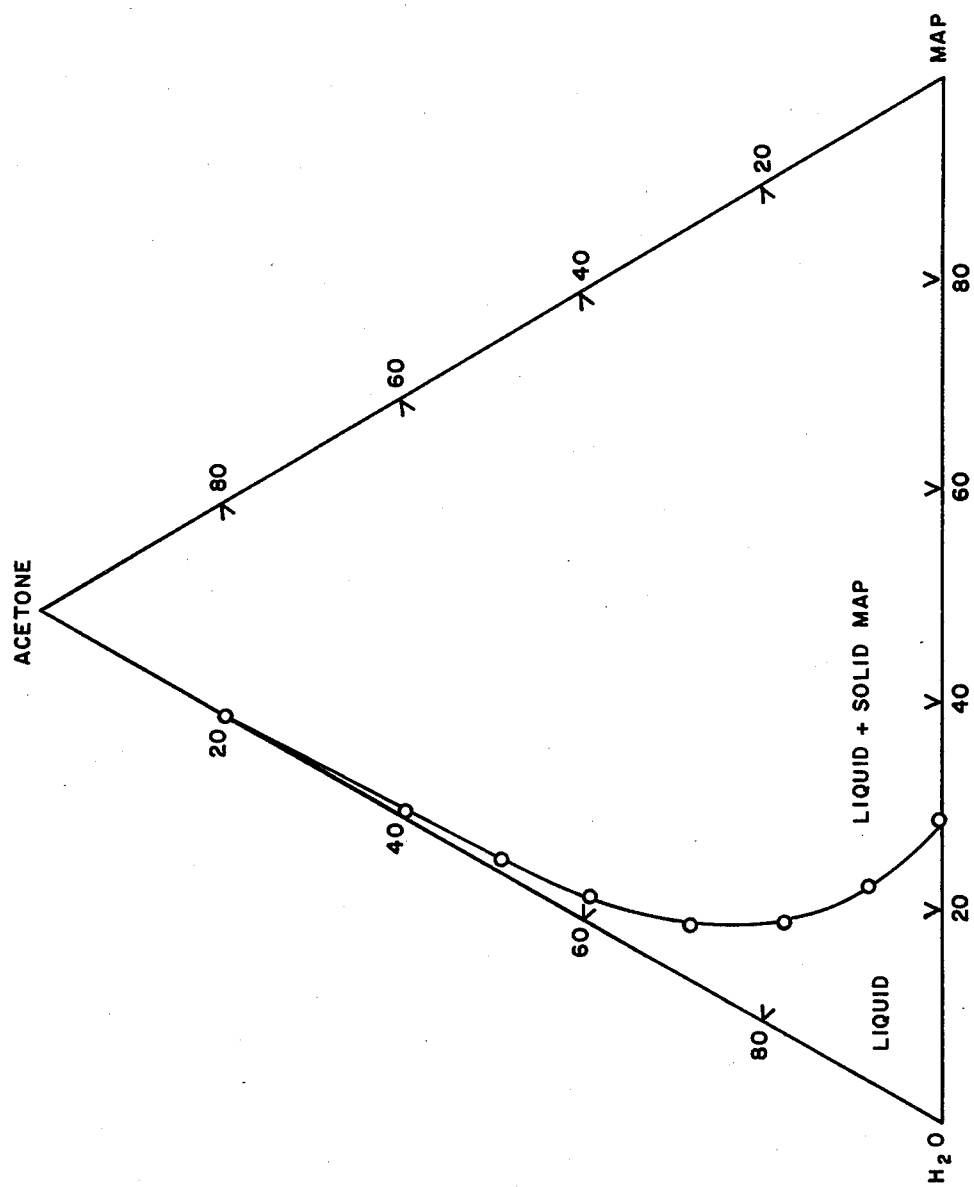
FIG. 1 is a phase diagram for the system monoammonium phosphate-acetone-water at 25° C.
Figure 2:
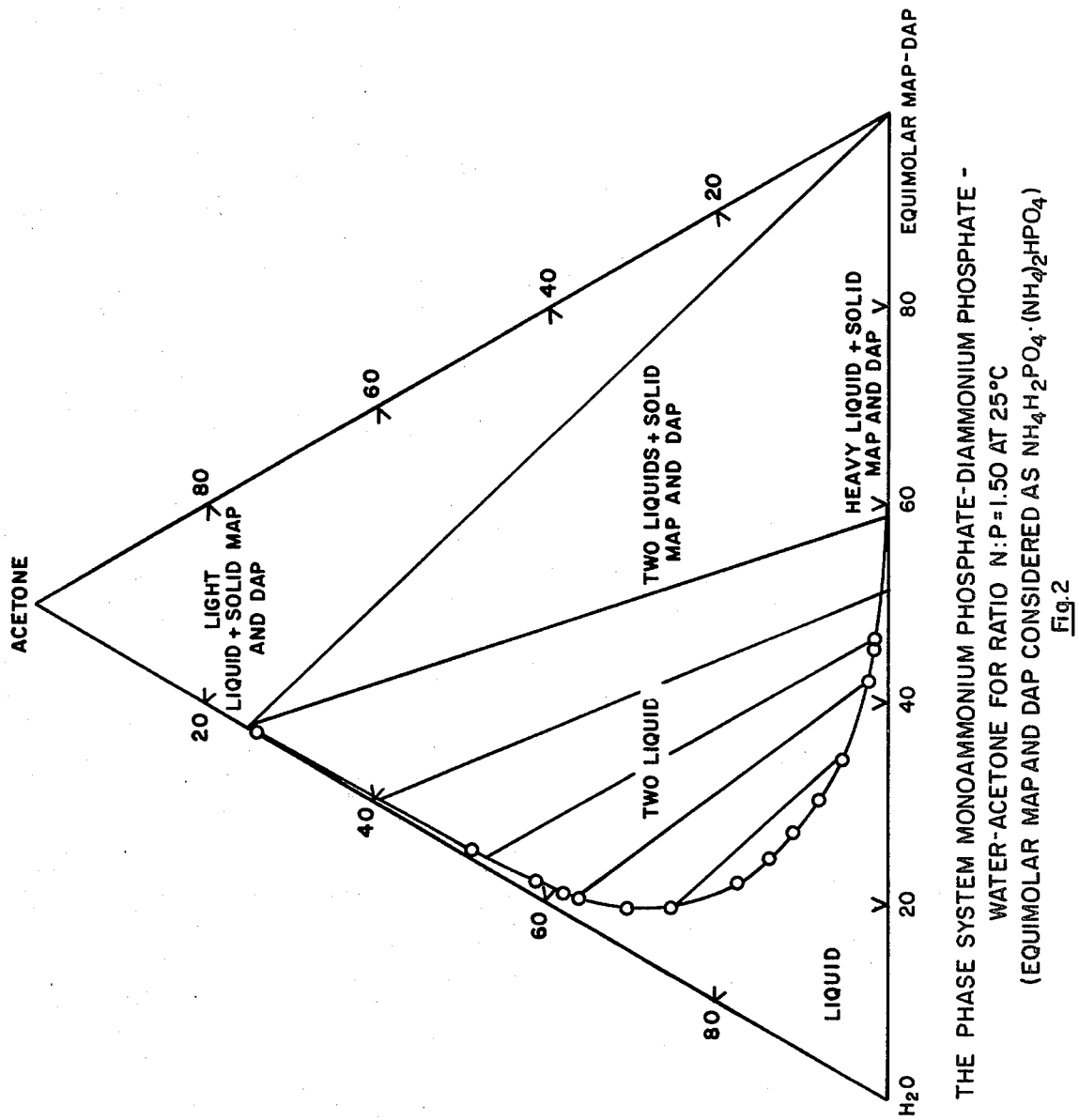
FIG. 2 is a phase diagram for the system ammonia-acetone-water-$P_2O_5$ at 25° C. when the atom ratio nitrogen:phosphorus is 1.50.
Figure 3:
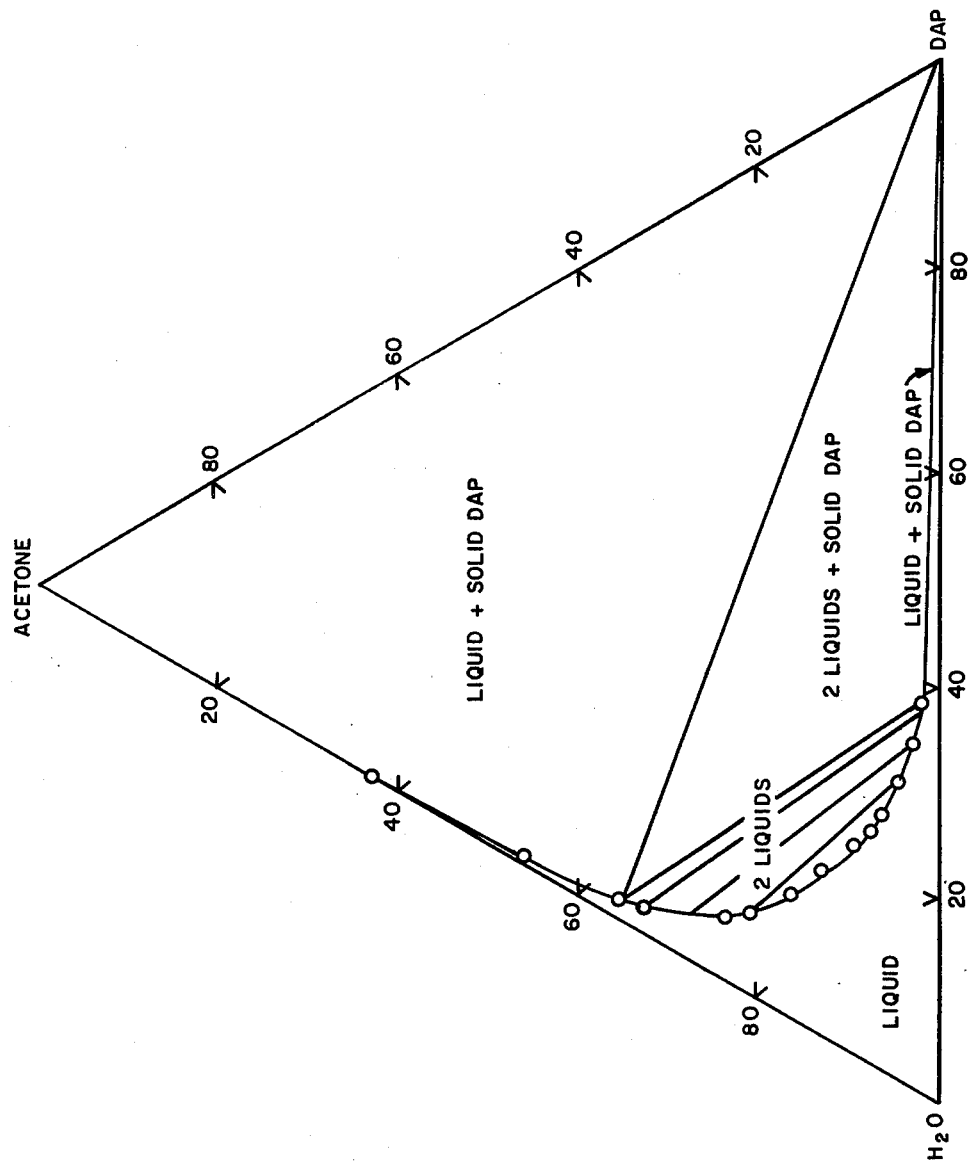
FIG. 3 is a phase diagram for the system diammonium phosphate-acetone-water at 25° C.

Referring now more specifically to FIGS. 1, 2, and 3, therein is presented the pertinent solubility data for the phase systems of MAP-water-acetone, of MAP-DAP-water-acetone at a N:P ratio of 1.5 and of DAP-water-acetone. The acetone concentration in the ammonium phosphate mother liquor will vary from 58 to 67 percent when the three to five Kg acetone/Kg $P_2O_5$ are used to purify wet-process acid containing 28 percent $P_2O_5$. As may be seen, FIGS. 1 and 3 show that only one liquid phase exists in equilibrium with solid MAP or DAP within this acetone concentration range. Two liquid phases may coexist in the DAP-acetone-water system but only when the acetone concentration is well below the recommended amount. If more dilute wet-process acids are purified with the lowest recommended level of acetone, 3 Kg/Kg $P_2O_5$, the $P_2O_5$ concentration in the wet-process acid would have to decrease to 14.4 percent before the acetone concentration in the DAP mother liquor reached 35 percent, the concentration where two liquids form.

In all cases, the concentration of ammonium phosphate in the mother liquor is low, less than 1 percent where 28 percent $P_2O_5$ wet-process acid is purified using the recommended amounts of acetone. This low solubility is completely unexpected because of the teaching of Von Semel et al and the report of Lenfesty et al. We have discovered from this solubility study that MAP is considerably more soluble than DAP, which is contrary to what might be expected from the ammonium phosphate solubility determinations of Lenfesty et al.

The behavior of an equal molar mixture of MAP and DAP in acetone and water is radially different from either MAP or DAP alone. Reference to FIG. 2 shows that at 25° C., two liquids and a solid may exist within the recommended acetone concentration range. The light liquid contains almost no ammonium phosphate while the heavy liquid contains almost no acetone. Application of this FIGURE to the prevent invention is discussed in greater detail infra.

Referring now more specifically to FIG. 4, for the sake of greater accuracy, the solubility of ammonium phosphate, expressed as $P_2O_5$, in acetone-water mixtures is found on an expanded scale. Reference to FIG. 4 shows the $P_2O_5$ solubility decreasing as both atom ratio N:P and acetone concentration increase. As noted previously, Lenfesty et al, the effect of N:P ratio on ammonium phosphate solubility in acetone-water solutions is contrary to expectations.

Referring now more specifically to FIG. 5, the fraction of total $P_2O_5$ left dissolved in the ammonium phosphate filtrate depends not only on the acetone concentration and the type of product produced (MAP or DAP), but it also depends on the mass of the mother liquor. This fraction, based on purifying wet-process acid containing 28 percent $P_2O_5$ is shown therein. The equal molar MAP-DAP line refers to the light liquid phase. Reference to FIG. 5 shows that dissolved $P_2O_5$ will vary from 1.6 percent down to 0.19 of input depending on the amount of acetone used and the product produced.

When the amount of ammonium phosphate left in solution is sufficiently low, acetone is distilled from the ammonium phosphate filtrate and the aqueous residue is discarded.

If minimizing $P_2O_5$ left in the aqueous residue were the only criterion for a successful process, producing DAP with the highest level of acetone would be the best method of converting impure phosphoric acid to finished fertilizer by the acetone route. But in some cases, it may be more desirable to use less acetone or to produce MAP rather than DAP.

When MAP is produced, the present invention includes two methods or embodiments of reducing the amount of ammonium phosphate left in the filtrate to a much lower level.

The present invention also includes a method of reducing $P_2O_5$ left in the filtrate to nil regardless of the ammonium phosphate product produced.

When MAP is produced at 25° C. within the recommended acetone concentration range, FIG. 4, supra, shows the $P_2O_5$ concentration in solution to vary from 0.092 to 0.30 percent. Rather than immediately distilling acetone from the MAP filtrate and discarding the aqueous residue, we prefer to further ammoniate the filtrate up to ratio N:P of 1.5 or 2.0.

If ammoniated to ratio 1.5, the mother liquor separates into two liquid phases. The heavier liquid is recycled (largely MAP, DAP, and water) and acetone is distilled from the lighter liquid. Application of the lever rule to FIG. 3 shows that the heavy liquid phase contains 50 to 60 percent of the $P_2O_5$ originally left in the MAP filtrate but its volume would be approximately 1/300 of the total filtrate volume. FIG. 5, supra, shows that this option reduces the $P_2O_5$ left in the filtrate to the range of 0.31 to 0.78 percent.

Alternatively, the MAP filtrate is ammoniated to ratio N:P of 2.0 causing DAP to precipitate. The DAP is combined with the MAP product and acetone is distilled from the filtrate as before. FIG. 5, supra, shows that this option reduces $P_2O_5$ left in the filtrate to the range of 0.19 percent to 0.52 percent.

When it is desirable to further reduce the ammonium phosphate left in any filtrate, sufficient lime is added to the filtrate prior to distilling acetone. This converts the ammonium phosphate to ammonia and discalcium phosphate. The dicalcium phosphate is separated from the liquid and returned to the phosphoric acid acidulation plant. Then acetone and ammonia are distilled and recovered from the liquid. The undistilled aqueous water is either discarded or returned to the phosphoric acid plant as filter cake wash water.

One of the advantages cited of the present process is the small amount of heat required for solvent recovery by distillation. The heat required to evaporate sufficient water from 28 percent $P_2O_5$ acid to concentrate the acid to 40 percent $P_2O_5$ is found in table II, infra. These heat requirements are compared to that required to distill acetone. Reference to table II shows that the heat energy now used to concentrate 28 percent acid to 40 percent $P_2O_5$ acid (the usual concentration for preparation of DAP) will be sufficient to distill all acetone in a process at the preferred level of acetone concentration.

TABLE II

Diammonium Phosphate Heat Requirements

Phosphoric Acid Concentration

| Initial $P_2O_5$ concn., wt., % | Heat, kcal/kg $P_2O_5$[a] |
|---|---|
| 24 | 798 |
| 28 | 578 |
| 32 | 413 |

Acetone Distillation

| Ratio acetone:$P_2O_5$ | Heat, kcal/kg $P_2O_5$ |
|---|---|
| 3.0 | 375 |
| 4.0 | 500 |
| 5.0 | 625 |

[a]Required to concentrate to 40 percent $P_2O_5$.

Referring now more specifically to FIG. 6, filter grade wet-process acid and ammonia or an ammonium compound, from sources not shown, are added to reactor 3 via lines 1 and 2. Acetone from a source described later flows to reactor 3 via lines 12 and 23. The reaction mixture slurry flows to filter 5 via line 4 where solids are separated from the purified acid extract. Solids are washed free of adhereing extract with recycle acetone entering filter 5 via line 6. The source of the acetone is described later. Wash liquor from filter 5 returns to reactor 3 via lines 7 and 12. The washed solids go to dryer 9 via line 8 where acetone is removed. The dryer offgas, line 10, is liquified in condenser 11 and returned to reactor 3 via line 12.

The purified acid extract leaves filter 5 via line 13 to reactor 14. Gaseous ammonia, from sources not shown, enters reactor 14 via line 15 and reacts with phosphoric acid in the extract. The ammonium phosphate reaction mixture leaves reactor 14 via line 16 to filter 17 where solid ammonium phosphate is separated from its mother liquor filtrate. The solid ammonium phosphate is withdrawn from filter 17 to dryer 19 via line 18. Offgas from dryer 19 goes to condenser 11 via line 20 and from there returns to reactor 3 via line 12.

Depending on operator preference, filtrate from filter 17 can be sent to distillation unit 21 via line 22 where acetone is distilled. Distilled acetone returns to reactor 3 via line 23 and also to filter 5 via line 6. Aqueous waste from distillation unit 21 is discarded.

Alternatively, filtrate from filter 17 may be sent to reactor 24 via line 22B. Lime from a source not shown enters reactor 24 via line 25. The reaction mixture leaves reactor 24 via line 26 to filtration unit 27 where dicalcium phosphate is separated from the liquid and returned to the wet-process acid plant which is not shown. The liquid is withdrawn from filtration unit 27 and introduced into distillation unit 29 via line 28 where acetone and ammonia are distilled from the aqueous waste. Acetone is returned to reactor 3 via line 23A. The aqueous waste is discarded.

Referring now more specifically to FIG. 7, when monoammonium phosphate is prepared, the filtrate leaving filter 17 via line 22 may be treated as shown therein. Filtrate from filter 17 enters mixer 30 via line 22A, 22C. Ammonia from a source not shown also enters mixer 30 via line 31 in sufficient quantity to raise the ratio N:P in the filtrate from 1.0 up to 1.5. The reaction mixture leaves mixer 30 via line 32 to settler 33 where the two liquid phases are allowed to separate. The heavy liquid is returned to reactor 3, FIG. 6 supra, and the light liquid is introduced into distillation unit 34 via line 35. Lime could be added to stream 35 prior to its entering distillation unit 34 in order to recover any ammonium phosphate remaining in stream 35. This variation was illustrated in FIG. 6 supra. Distillate leaves distillation unit 34 via line 35A and is returned to reactor 3. Aqueous waste is discarded.

The above-described variation requires mixer-settlers to recover ammonium phosphate. If liquid-solid rather than liquid-liquid separation is preferred, we have discovered still another variation of the instant process which is as follows: Filtrate from filter 17 enters reactor 36 via line 22A, 22D. Ammonia from a source not shown enters reactor 36 via line 37 in sufficient amount to raise the N:P atom ratio of the filtrate from 1.0 to 2.0. Slurry from reactor 36 enters filter 39 via line 38. Solid DAP is separated and combined with the MAP product. Filtrate leaves filter 39 via line 40 for distillation unit 34 where acetone is distilled and returned to reactor 3 via line 35a. Aqueous waste is discarded. As before, additional phosphate can be recovered as dicalcium phosphate by adding lime to stream 40 prior to distillation.

Uranium removed from the acid is an optional feature of the invention. Referring back to FIG. 6, this removal is achieved by adding reducing agent to reactor 3 via line 49, causing uranium to precipitate with other objectionable impurities.

Additional purification of the acid is possible by adding an acid-soluble calcium containing material to reactor 3 via line 50. This feature of the invention is also presented in FIG. 6.

In order that those skilled in the art may better understand how the present invention can be practiced and more fully and definitely understood, the following examples are given by way of illustration and not necessarily by way of limitation.

EXAMPLE I

The effects of added acetone and ammonia on the removal of $P_2O_5$ and acid impurities from filter-grade wet-process phosphoric acid were measured within the following range of variables using a Box central composite experimental design. (Box, G. E. P. and Wilson, K. B., *J. Roy Stat. Soc.*, B, 1951.) The advantages of using a design of this type are that a small number of experiments are required to represent the effects of added acetone and ammonia on degree of acid purification with a second degree polynomial. Main effects are not confounded with two factor interactions.

| Variable | Minimum | Maximum | Levels |
|---|---|---|---|
| Weight ratio acetone:$P_2O_5$ | 1.5 | 4.5 | 5 |
| Atom ratio nitrogen:phosphorus | 0.057 | 0.257 | 5 |

Calculated amounts of $NH_4HCO_3$ were added to 100 g of the filter-grade wet-process acid whose composition is found below:

| Component | Composition, Wt. % |
|---|---|
| $P_2O_5$ | 28.3 |
| N | 0.04 |
| $Al_2O_3$ | 0.70 |
| $Fe_2O_3$ | 1.1 |
| MgO | 0.42 |
| F | 2.0 |
| $SO_3$ | 1.6 |
| $SiO_2$ | 0.84 |

-continued

| Component | Composition, Wt. % |
|---|---|
| CaO | 0.09 |

The ammoniated acid was warmed to 70° C. and then the calculated amount of acetone was added over a 30-minute period. The mixture was heated under reflux with stirring for an additional two hours. Two liquid phases initially formed. The lower phase turned to solids within one hour or less, with the exception of observation four (see table III infra), which required two hours for solids to form. The reaction mixture was filtered hot. The solids were washed with about 150 mL of acetone, air dried and analyzed. Results are found in Table III below.

TABLE III
Results of Acid Purification Batch Tests

| Observation | Atom ratio N:P | Weight ratio acetone:$P_2O_5$ | Weight percent precipitated | | | | | |
|---|---|---|---|---|---|---|---|---|
| | | | $P_2O_5$ | $Al_2O_3$ | $Fe_2O_3$ | MgO | $SO_4$ | F |
| 1 | 0.057 | 2.0 | 3.16 | 30 | 39 | 22 | 6.9 | 17 |
| 2 | 0.257 | 2.0 | 4.86 | 27 | 47 | 13 | 5.7 | 31 |
| 3 | 0.057 | 4.0 | 9.44 | 95 | 87 | 74 | 15 | 49 |
| 4[a] | 0.257 | 4.0 | 16.2 | 97 | 98 | 78 | 42 | 77 |
| 5 | 0.107 | 3.0 | 10.2 | 90 | 85 | 59 | 17 | 50 |
| 6 | 0.207 | 3.0 | 12.8 | 97 | 96 | 76 | 27 | 72 |
| 7 | 0.157 | 1.5 | 3.17 | 16 | 36 | 14 | 7.1 | 13 |
| 8 | 0.157 | 4.5 | 11.8 | 93 | 90 | 59 | 24 | 73 |
| 9 | 0.157 | 3.0 | 11.2 | 93 | 94 | 60 | 19 | 61 |
| 10 | 0.157 | 3.0 | 11.1 | 93 | 93 | 63 | 21 | 58 |
| 11 | 0.157 | 3.0 | 11.5 | 94 | 94 | 62 | 19 | 63 |
| 12 | 0.157 | 3.0 | 11.9 | 93 | 94 | 60 | 19 | 67 |

[a]Solids formed after 90 minutes. In other tests, solids formed after 60 minutes or less.

Referring now more specifically to FIGS. 8-13, quadratic response equations, generated by standard statistical techniques ("Applied Regression Analysis," Draper, N. R., and Smith, H., pages 171-173, John Wiley and Sons, Inc., 1966), were used to predict the effects of acetone and ammonia concentration on the degree of acid purification and $P_2O_5$ loss.

Examination of these FIGS. i.e., 8-13, shows the following: In all cases the effect of acetone on degree of purification was greater than ammonia. Increasing the level of either increased the degree of purification. Ammonia had no statistically significant effect on magnesium purification.

The incremental increase in iron, aluminum, magnesium, and fluorine purification decreased as larger amounts of acetone and ammonia were used. Using weight ratio acetone:$P_2O_5$ higher than 4.5 and atom ratio nitrogen to phosphorus higher than 0.2 produced little increase in purification.

EXAMPLE II

The effects of calcium, silica and potassium concentration and oxidation potential in the acid on the removal of selected impurities and $P_2O_5$ by acetone and ammonia were investigated with a two-level one-half fractorial design requiring eight experiments. Two factor interactions are confounded in this design; therefore, it is assumed that interactions involving oxidation potential were negligible. Subsequent analysis showed that the effects of all but two interactions on degree of purification were insignificant.

The effects of the four variables on purification were measured within the following range.

| Variable | Minimum | Maximum | Levels |
|---|---|---|---|
| Silica, g/g $P_2O_5$ | 0.02 | 0.08 | 2 |
| Calcium, g/g $P_2O_5$ | 0.001 | 0.023 | 2 |
| Potassium, g/g $P_2O_5$ | ~0.001 | 0.026 | 2 |
| Oxidation potential MV | <240 | >500 | 2 |

Commercially supplied phosphate rock, silicic acid, and potassium chloride were the sources of calcium, silica, and potassium. The oxidation potential of the acid was adjusted to either <240 mv (Pt electrode vs. saturated calomel electrode) with 0.1 g zinc/100 g acid solution or >540 mv with 1 mL of 30-percent hydrogen peroxide/100 g acid solution.

The composition of the acid used in the tests is shown below.

| Wet-Process Acid Component | Composition, Wt. % |
|---|---|
| $P_2O_5$ | 30.4 |
| N | 0.05 |
| $Al_2O_3$ | 0.53 |
| $Fe_2O_3$ | 1.2 |
| MgO | 0.44 |
| F | 2.1 |
| $SO_3$ | 1.9 |
| CaO | 0.06 |
| $SiO_2$ | 0.6 |
| U | 0.0149 |
| $K_2O$ | ~0.02 |

The purification procedure is similar to that used in Example I except that calculated amounts of ammonium bicarbonate, zinc or hydrogen peroxide, silicic acid, potassium chloride, and phosphate rock were mixed with the acid for one hour at 70° C. prior to adding the acetone. In all tests, the atom ratio N:P and weight ratio acetone:$P_2O_5$ used were 0.15 and 2.8, respectively. Results are found in table IV below.

TABLE IV
Additional Batch Purification Test Results

| Observation | Potassium, g/g $P_2O_5$ | Calcium, g/g $P_2O_5$ | Silica, g/g $P_2O_5$ | Oxidation potential, mV | Wt. % precipitated | | | | | |
|---|---|---|---|---|---|---|---|---|---|---|
| | | | | | $P_2O_5$ | $Fe_2O_3$ | MgO | $U_3O_6$ | $K_2O$ | F |
| 1 | 0.026 | 0.023 | 0.08 | >500 | 15.0 | 99 | 47 | 25 | 94 | 91 |
| 2 | 0.001 | 0.023 | 0.08 | <240 | 12.8 | 98 | 72 | 79 | — | 81 |
| 3 | 0.026 | 0.001 | 0.08 | <240 | 12.6 | 85 | 43 | 71 | 94 | 83 |
| 4 | 0.001 | 0.001 | 0.08 | >500 | 12.7 | 97 | 73 | 10 | — | 68 |
| 5 | 0.026 | 0.023 | 0.002 | <240 | 12.6 | 89 | 72 | 78 | 95 | 91 |
| 6 | 0.001 | 0.023 | 0.002 | >500 | 14.0 | 100 | 85 | 18 | — | 84 |
| 7 | 0.026 | 0.001 | 0.02 | >500 | 12.3 | 93 | 33 | 7.7 | 94 | 82 |
| 8 | 0.001 | 0.001 | 0.02 | <240 | 11.3 | 86 | 67 | 76 | — | 65 |

The effects of the independent variables on $P_2O_5$ and impurity removal were analyzed by standard statistical techniques (Draper and Smith supra). The results of the analysis are found in table V, infra. In this table, Ao refers to the average amount of impurity precipitated. Other values refer to the percent change in the amount of precipitated impurity when the value of the independent variable is increased from the lowest to the highest value. All reported effects are significant at the 90-percent confidence level. The $X_1X_2$ and $X_2X_3$ terms refer to the combined effects of potassium-calcium and calcium-silica.

TABLE V

Effects of Potassium, Calcium, Potassium and Oxidation Potential on Wet Acid Purification

| Acid Component | Ao | Potassium | Calcium | Silica | Oxidation Potential | $X_1X_2$ | $X_2X_3$ |
|---|---|---|---|---|---|---|---|
| $P_2O_5$ | 12.9 | — | 0.69 | — | 0.55 | — | — |
| $Fe_2O_3$ | 93.5 | −1.9 | 3.1 | — | 3.9 | — | — |
| MgO | 61.5 | −12.6 | 7.6 | — | — | — | 6.7 |
| F | 81.0 | 6.1 | 6.0 | — | — | −1.7 | — |
| $U_3O_8$ | 45.6 | — | 4.3 | — | −30.6 | — | — |

EXAMPLE III

The phosphoric acid described in Example I was pre-ammoniated with ammonium bicarbonate to an atom ratio N:P of 0.15, preheated to 65° C., then pumped to a heated reactor equipped with stirrer, reflux condenser and overflow tube to continuously remove reaction products. Acetone was pumped to the reactor at a rate of either three or four Kg acetone per Kg $P_2O_5$. The reaction was run to steady state conditions. The results of these tests indicate that a retention time of greater than 37 minutes is required in order to obtain a solid with satisfactory physical properties.

| Retention time, min. | Physical State of Impure Phase |
|---|---|
| 15 | liquid |
| 37 | sticky solid |
| 60 | granules |
| 120 | easily filtering fines |

EXAMPLE IV

The wet-process acid described in Example I was treated with 4 Kg acetone per $Kg_2O_5$ and 0.15 mole ammonia per g-atom phosphorus as described in said Example I. The purified phosphoric acid extract and gaseous ammonia were continuously added to a reactor at such a rate that the mole ratio $NH_3$:$P_2O_5$ was 4.0 and the retention time in the reactor was one hour. The reactor was fitted with a stirrer, reflux condenser, and cooling coils. Temperature was kept at 25° C. The DAP-acetone-water reaction mixture continuously overflowed from the reactor. When steady state was achieved, the mixture was filtered and the solid DAP analyzed with the following result:

| Component | Composition, Wt. % |
|---|---|
| $P_2O_5$ | 50.0 |
| N | 21.1 |
| $Al_2O_3$ | 0.05 |
| $Fe_2O_3$ | 0.18 |
| CaO | 0.02 |
| MgO | 0.25 |
| F | 1.2 |
| $SO_3$ | 2.4 |

EXAMPLE V

A purified phosphoric acid-acetone extract was ammoniated to pH 4.67 in a flask equipped with stirrer and condenser. This pH is that of a saturated monoammonium phosphate mixture. Temperature was maintained at 25° C. The resulting mixture was filtered, the cake washed with acetone, and dried. The cake was identified as monoammonium phosphate by petrographic examination.

EXAMPLE VI

Phase boundaries for the system $NH_3$-$P_2O_5$-$H_2O$-acetone were determined at 25.0°±0.1° C. Tie lines for the liquid-liquid portions of the systems were determined by equilibrating stock solutions of either a MAP-DAP equal molar mixture of DAP with acetone-water solutions in various proportions for two weeks. Ammonia analysis was used to calculate ammonium phosphate concentration in the liquid phase. Critical opalescence titrations were used to determine liquid-liquid phase boundaries.

Results are found in Tables VI, VII, and VII below as well as in FIGS. 1, 2, and 3, supra.

TABLE VI

The System $NH_3$—$P_2O_5$—$H_2O$—Acetone With Ratio N:P = 1.0 at 25° C.

Saturated solution composition, wt. %

| Acetone | $H_2O$ | $NH_3$ | $P_2O_5$ | Monoammonium phosphate |
|---|---|---|---|---|
| 0 | 71.0 | 4.29 | 17.90 | 29.0 |
| 8.3 | 73.3 | 2.73 | 11.44 | 18.4 |
| 17.9 | 71.6 | 1.56 | 6.50 | 10.5 |
| 28.3 | 66.4 | 0.79 | 3.34 | 5.3 |
| 39.2 | 58.4 | 0.36 | 1.53 | 2.4 |
| 49.2 | 49.7 | 0.16 | 0.674 | 1.1 |
| 59.7 | 39.9 | 0.059 | 0.249 | 0.40 |
| 79.7 | 20.3 | 0.0039 | 0.018 | 0.026 |
| 99.8 | 0.24 | 0.00014 | 0.00047 | 0.00095 |

TABLE VII

The System $NH_3$—$P_2O_5$—$H_2O$—Acetone With Ratio N:P = 1.5 at 25° C.

| Solution number | Solution composition on the two-liquid phase boundary, wt. % | | |
|---|---|---|---|
| | Acetone | $H_2O$ | Salt |
| 1 | 1.5 | 53.1 | 45.4 |
| 2 | 1.6 | 54.0 | 44.4 |
| 3 | 2.4 | 57.3 | 40.3 |
| 4 | 5.1 | 63.4 | 31.5 |
| 5 | 7.9 | 66.4 | 25.9 |
| 6 | 11.0 | 67.7 | 21.3 |
| 7 | 13.9 | 68.8 | 17.3 |
| 8 | 17.3 | 69.6 | 13.2 |
| 9 | 24.8 | 68.4 | 6.8 |

TABLE VII-continued

The System $NH_3$—$P_2O_5$—$H_2O$—Acetone With Ratio N:P = 1.5 at 25° C.

| | | | |
|---|---|---|---|
| 10 | 30.1 | 65.9 | 4.02 |
| 11 | 37.5 | 60.6 | 1.90 |
| 12 | 38.8 | 59.5 | 1.70 |
| 13 | 40.9 | 57.7 | 1.37 |
| 14 | 49.4 | 50.0 | 0.57 |
| 15 | 74.1 | 25.9 | 0.040 |
| 16 | 76.0 | 24.0 | 0.037 |

| Solution number | Composition of solutions in equilibrium, wt. % | | | | | | | | | |
|---|---|---|---|---|---|---|---|---|---|---|
| | Light phase | | | | | Heavy phase | | | | |
| | Acetone | $H_2O$ | $NH_3$ | $P_2O_5$ | Salt | Acetone | $H_2O$ | $NH_3$ | $P_2O_5$ | Salt |
| 17[a] | 75.0 | 25.0 | <0.01 | 0.02 | 0.03 | 0.15 | 41.4 | 12.1 | 33.0 | 58.5 |
| 18[a] | 75.0 | 25.0 | <0.01 | 0.02 | 0.03 | 0.05 | 40.9 | 12.2 | 33.3 | 59.0 |
| 19[b] | 59.6 | 40.1 | 0.059 | 0.24 | 0.3 | 0.09 | 48.8 | 10.4 | 29.0 | 50.3 |
| 20[b] | 47.0 | 52.1 | 0.18 | 0.64 | 0.87 | 1.5 | 52.8 | 9.45 | 26.1 | 45.7 |
| 21[b] | 37.0 | 61.0 | 0.42 | 1.41 | 2.0 | 2.3 | 56.7 | 8.49 | 23.5 | 41.0 |
| 22[b] | 24.0 | 68.8 | 1.49 | 4.37 | 7.2 | 4.9 | 63.0 | 6.64 | 18.2 | 32.1 |

[a]These mixtures contained a solid phase of MAP and DAP.
[b]No solid present in these mixtures.

TABLE VIII

The System $NH_3$—$P_2O_5$—$H_2O$—Acetone With Ratio N:P = 2.0 at 25° C.

| Solution composition of the two-liquid phase boundary, wt. % | | |
|---|---|---|
| Acetone | $H_2O$ | Diammonium phosphate |
| 1.6 | 61.0 | 37.4 |
| 1.7 | 60.9 | 37.4 |
| 2.5 | 64.3 | 33.2 |
| 4.1 | 67.2 | 28.7 |
| 6.3 | 69.3 | 24.4 |
| 7.6 | 70.2 | 22.2 |
| 9.3 | 70.7 | 20.0 |
| 11.0 | 71.2 | 17.8 |
| 12.7 | 71.6 | 15.7 |
| 16.4 | 71.9 | 11.7 |
| 20.6 | 71.5 | 7.9 |
| 23.4 | 70.5 | 6.1 |
| 39.8 | 66.7 | 3.5 |
| 32.2 | 65.1 | 2.7 |
| 35.2 | 62.9 | 1.9 |
| 35.4 | 62.7 | 1.9 |

| Single liquid phase solution composition, wt. % | | | | |
|---|---|---|---|---|
| Acetone | $H_2O$ | $NH_3$ | $P_2O_5$ | Diammonium phosphate |
| 40.7 | 58.1 | 0.30 | 0.70 | 1.2 |
| 49.8 | 49.8 | 0.11 | 0.26 | 0.43 |
| 66.7 | 33.3 | 0.015 | 0.041 | 0.058 |

| Composition of solutions in equilibrium, wt. % | | | | | | | | | | Solid phase |
|---|---|---|---|---|---|---|---|---|---|---|
| Light phase | | | | | Heavy phase | | | | | |
| Acetone | $H_2O$ | $NH_3$ | $P_2O_5$ | DAP | Acetone | $H_2O$ | $NH_3$ | $P_2O_5$ | DAP | |
| 63.0 | 35.0 | 0.52 | 1.01 | 2.0 | 1.6 | 60.8 | 9.69 | 20.6 | 37.6 | DAP |
| 63.0 | 35.0 | 0.52 | 0.97 | 2.0 | 1.6 | 60.8 | 9.69 | 20.3 | 37.6 | DAP |
| 64.8 | 32.6 | 0.68 | 1.34 | 2.6 | 1.8 | 61.9 | 9.35 | 19.4 | 36.3 | None |
| 68.0 | 27.9 | 1.06 | 2.12 | 4.1 | 2.7 | 64.6 | 8.42 | 17.6 | 32.7 | None |
| 71.2 | 21.7 | 1.83 | 3.72 | 7.1 | 4.4 | 67.6 | 7.21 | 15.1 | 28.0 | None |
| 72.0 | 15.4 | 3.25 | 6.72 | 12.6 | 7.4 | 70.0 | 5.82 | 12.0 | 22.6 | None |

After sifting and winnowing through the data supra, as well as other results of tests and operation of our new, novel and improved method of purification and conversion of phosphoric acid to ammonium phosphate, it is now evident that addition of both acetone and ammonia to wet-process acid causes impurities to precipitate. By heating the reaction mixture for a period of time, the solids are in an easily filterable form and contain less $P_2O_5$ than the heavy liquid produced in the process of Walters et al, supra. If uranium is in the reduced form, it also precipitates. A low oxidation potential in the acid inhibited iron precipitated but the effect was minor. The addition of a small amount of soluble calcium to the acid prior to acetone addition also improved purification, particularly magnesium and fluorine. An acceptable range of variables in the purification portion of the process is as follows:

| Variable | Range |
|---|---|
| Weight ratio acetone:$P_2O_5$ | 2.0–5.0 |
| Atom ratio nitrogen:$P_2O_5$ | 0.05–0.30 |
| Purification temperature, °C. | 50–boiling |
| Retention time, hr. | 0.75–2.0 |

The preferred range of acetone and ammonia would be, respectively, 3.0 to 4.5 Kg/Kg $P_2O_5$ and 0.10 to 0.20 mole ammonia per g-atom phosphorus.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for purifying wet-process phosphoric acid, which process employs the use of acetone and a source of ammonia, and which process comprises the following steps:
   (1) introducing into first reacting means streams comprising acetone from later-mentioned filtering means, condensing means, and distillation means, a stream of phosphoric acid and a stream of a source of ammonia to produce a resulting reaction slurry therein;
   (2) maintaining a temperature in said first reacting means above 50° C. and maintaining the material therein for a period of time ranging from about 45 minutes to about 120 minutes;
   (3) removing at least a portion of said slurry from said first reacting means and introducing same into first filtering means wherein the solids are separated from the liquid in said reaction slurry formed in said first reacting means supra;
   (4) recovering said separated solids from said first filtering means and washing same with acetone to effect the removal of the residual mother liquor phosphoric acid adhering to the surfaces thereof;
   (5) removing the wash effluent comprising acetone and residual phosphoric acid mother liquor from said first filtering means and introducing same into said first reacting means;
   (6) removing the recovered separated solids from said first filtering means and introducing same into drying means, wherefrom is recovered a resulting dried solid fertilizer product and wherefrom is evolved offgases containing residual acetone;
   (7) introducing said acetone containing offgases from said first drying means into condensing means to effect the condensation and recovery of said acetone therein and subsequent introduction of said recovered condensed acetone into said first reacting means;
   (8) removing the filtrate from said first filtering means and introducing same into a second reacting means together with a stream of ammonia to produce therein a slurry, said ammonia introduced into said second reacting means being so proportioned as to provide therein a mixture of ammonium phosphate having a mole ratio $NH_3:P_2O_5$ of about 2;
   (9) removing from said second reacting means at least a portion of the resulting slurry formed therein and introducing same into second filtering means;
   (10) recovering the solids of ammonium phosphate from said second filtering means and introducing same into drying means wherefrom is recovered dried solid ammonium phosphate fertilizer product and an offgas containing residual acetone;
   (11) introducing said residual acetone containing offgases into condensing means wherefrom the resulting recovered condensed acetone is introduced into said first reacting means;
   (12) removing the filtrate from said second filtering means and introducing same into distillation means wherefrom is recovered distilled acetone, which distilled acetone is subsequently introduced into said first reacting means.

2. The process of claim 1 wherein in said first reacting means, for each gram atom of phosphorus in said phosphoric acid introduced therein, from about 0.05 to about 0.3 moles of ammonia from said ammonia source are utilized, and wherein, for each Kg of $P_2O_5$ in said phosphoric acid introduced therein, from about 2 to about 5 Kg of acetone are utilized.

3. The process of claim 2 wherein the step of proportioning the ammonia in said second reacting means the $NH_3:P_2O_5$ mole ratio is maintained at about 4.

4. The process of claim 3 wherein a sufficient amount of said acid-soluble calcium containing compound is added to said first reacting means along with said phosphoric acid, ammonia source, and acetone to supply for each Kg of $P_2O_5$ added thereto up to about 0.023 Kg of soluble calcium.

5. The process of claim 3 wherein a reducing agent selected from the group consisting of iron, aluminum, zinc, and mixtures thereof is introduced into or along with said phosphoric acid stream supplied to said first reacting means, said reducing agent being of predetermined quantity sufficient to reduce the oxidation potential of said phosphoric acid to less than about 240 mv as determined with a pair of platinum and calomel electrodes at 25° C. to thereby effect a concentration of uranium values originally present in said phosphoric acid into the solids portion of the slurry formed in said first reacting means.

6. The process of claim 5 wherein a sufficient amount of an acid-soluble calcium containing compound is added to said first reacting means along with said phosphoric acid, ammonia source, and acetone to supply for each Kg of $P_2O_5$ added thereto up to about 0.023 Kg of soluble calcium.

7. The process of claim 5 wherein a reducing agent selected from the group consisting of iron, aluminum, zinc, and mixtures thereof, is introduced into or along with said phosphoric acid stream supplied to said first reacting means, said reducing agent being of predetermined quantity sufficient to reduce the oxidation potential of said phosphoric acid to less than about 240 mv as determined with a pair of platinum and calomel electrodes at 25° C. to thereby effect a concentration of uranium values originally present in said phosphoric acid into the solids portion of the slurry formed in said first reacting means.

8. The process of claim 5 wherein:
   (1) the filtrate from said second filtering means containing monoammonium phosphate solution is removed therefrom and introduced into mixing means together with a stream of ammonia, said ammonia proportioned to said monoammonium phosphate solution introduced into said mixing means so as to produce a mixture therein having a $NH_3:P_2O_5$ mole ratio of about 3;
   (2) removing said mixture from said mixing means and introducing same into settling means wherein said mixture is allowed to settle into a heavy fraction and a light fraction;

(3) removing said heavy fraction from said settling means and introducing same into said first reacting means; and (4) removing said light fraction from said settling means and introducing said light fraction into said distillation means wherefrom is distilled acetone, which distilled acetone is subsequently introduced into said first reacting means.

9. The process of claim 5 wherein:

(1) the filtrate removed from said second filtering means is introduced into third reacting means together with a stream of ammonia, said ammonia proportioned to the monoammonium phosphate solution so as to effect a slurry wherein the $NH_3:P_2O_5$ mole ratio is about 4;

(2) removing said slurry from said third reacting means to third filtering means, wherefrom mixtures of diammonium phosphate are recovered as product;

(3) removing as filtrate from said third filtering means the resulting solution; and (4) introducing same into said distillation means wherefrom is distilled acetone, which distilled acetone is subsequently introduced into said first reacting means.

10. The process of claim 1 wherein in step 8 thereof the $NH_3:P_2O_5$ mole ratio is maintained at about 4.

* * * * *

UNITED STATES PATENT AND TRADEMARK OFFICE
CERTIFICATE OF CORRECTION

PATENT NO. : 4,236,911
DATED : December 2, 1980
INVENTOR(S) : John F. McCullough, Leslie R. Tate, and John F. Phillips, Jr.

It is certified that error appears in the above-identified patent and that said Letters Patent are hereby corrected as shown below:

Column 18, Claim 6, line 37, change "claim 5" to -- claim 2 --

Claim 7, line 43, change "claim 5" to -- claim 2 --

Claim 8, line 55, change "claim 5" to -- claim 2 --

Column 19, Claim 9, line 10, change "claim 5" to -- claim 2 --

Signed and Sealed this

Seventeenth Day of March 1981

[SEAL]

Attest:

RENE D. TEGTMEYER

Attesting Officer    Acting Commissioner of Patents and Trademarks